US012774250B2

(12) United States Patent
Boursier et al.

(10) Patent No.: US 12,774,250 B2
(45) Date of Patent: Oct. 27, 2026

(54) METHOD FOR INSERTING CLAYS IN HYDRAULIC COMPOSITIONS INTENDED FOR THE CONSTRUCTION INDUSTRY

(71) Applicant: SNF GROUP, Andrezieux-Boutheon (FR)

(72) Inventors: Thomas Boursier, Andrezieux (FR); Julien Mesnager, Andrezieux (FR); Frédéric Blondel, Andrezieux (FR); Cédrick Favero, Andrezieux (FR); Johann Kieffer, Andrezieux (FR)

(73) Assignee: SNF GROUP, Andrezieux-Boutheon (FR)

( * ) Notice: Subject to any disclaimer, the term of this patent is extended or adjusted under 35 U.S.C. 154(b) by 599 days.

(21) Appl. No.: 18/257,035

(22) PCT Filed: Dec. 22, 2021

(86) PCT No.: PCT/EP2021/087350

§ 371 (c)(1),
(2) Date: Jun. 12, 2023

(87) PCT Pub. No.: WO2022/136574

PCT Pub. Date: Jun. 30, 2022

(65) Prior Publication Data

US 2024/0034678 A1 Feb. 1, 2024

(30) Foreign Application Priority Data

Dec. 23, 2020 (FR) ....................................... 2014074

(51) Int. Cl.

| | |
|---|---|
| ***C04B 24/26*** | (2006.01) |
| ***C04B 14/10*** | (2006.01) |
| ***C04B 28/02*** | (2006.01) |
| ***C04B 28/04*** | (2006.01) |
| ***C08F 18/22*** | (2006.01) |
| ***C08F 20/56*** | (2006.01) |
| ***C08F 26/02*** | (2006.01) |
| *C04B 103/00* | (2006.01) |
| *C04B 103/32* | (2006.01) |

(52) U.S. Cl.

CPC .......... *C04B 24/2652* (2013.01); *C04B 14/10* (2013.01); *C04B 28/02* (2013.01); *C04B 28/04* (2013.01); *C08F 18/22* (2013.01); *C08F 20/56* (2013.01); *C08F 26/02* (2013.01); *C04B 2103/0052* (2013.01); *C04B 2103/32* (2013.01)

(58) Field of Classification Search

CPC ..... C04B 24/2652; C04B 14/10; C04B 28/04; C04B 28/02; C04B 2013/32; C08F 20/56

USPC .............................................................. 524/2

See application file for complete search history.

(56) References Cited

U.S. PATENT DOCUMENTS

| | | | | |
|---|---|---|---|---|
| 4,460,720 | A | 7/1984 | Gaidis et al. | |
| 5,092,935 | A * | 3/1992 | Crema .................... | C04B 28/02 106/808 |
| 2013/0035417 | A1 | 2/2013 | Villard et al. | |
| 2019/0112229 | A1 * | 4/2019 | Zhao .................... | C09D 17/001 |

FOREIGN PATENT DOCUMENTS

| | | | |
|---|---|---|---|
| CN | 108328987 | A | 7/2018 |
| WO | 2006032785 | A2 | 3/2006 |

OTHER PUBLICATIONS

FR 2014074, INPI Rapport de Recherche Preliminaire, Aug. 26, 2021, 2 pages.

International Search Report, PCT/EP/2021/087350, Apr. 7, 2022, 2 pages.

* cited by examiner

*Primary Examiner* — Ruiyun Zhang

(74) *Attorney, Agent, or Firm* — Soquel Group LLC

(57) ABSTRACT

The present invention relates to a method for inerting clays in hydraulic compositions intended for construction purposes, said method comprising a step of adding to the hydraulic composition or to one of its constituents at least one clay inerting agent, characterised in that the clay inerting agent is a water-soluble polymer comprising acrylamide, and/or vinylamine, and/or vinylformamide monomer units, and optionally monomer units of a different chemical nature from the abovementioned chemical natures, and characterised in that its weight average molecular weight is between Mw L and Mw H.

14 Claims, No Drawings

METHOD FOR INSERTING CLAYS IN HYDRAULIC COMPOSITIONS INTENDED FOR THE CONSTRUCTION INDUSTRY

CROSS-REFERENCE TO RELATED APPLICATIONS

This application claims benefit under 35 USC § 371 of PCT Application No. PCT/EP2021/087350 entitled METHOD FOR INSERTING CLAYS IN HYDRAULIC COMPOSITIONS INTENDED FOR CONSTRUCTION, filed on Dec. 22, 2021 by inventors Thomas Boursier, Julien Mesnager, Frédéric Blondel, Cédrick Favero, and Johann Kieffer. PCT Application No. PCT/EP2021/087350 claims priority of French Patent Application No. 20 14074, filed on Dec. 23, 2020.

FIELD OF THE INVENTION

The present invention relates to a method for inerting clays in hydraulic compositions intended for construction purposes.

BACKGROUND OF THE INVENTION

Hydraulic compositions intended for construction, such as cement compositions, contain aggregates and in particular sands of varying quality. The scarcity of these materials sometimes forces the person skilled in the art to turn to rock crushing. Generally speaking, there is a decrease in the quality of the aggregates, which contain a substantial quantity of clays, some of which are swelling clays, i.e. they will hydrate by absorbing a very large quantity of water both on their external and internal surfaces through expansion of their interleaf space. These variations cause significant fluctuations in the properties of the hydraulic compositions, such as inappropriate rheological properties in the fresh state, and even the embrittlement of the structures in the hardened state, thus creating obvious safety problems.

A hydraulic composition is characterised by its water/hydraulic binder ratio. The strength and durability of the finished material depends on this ratio. The lower the ratio, the better the strength and durability. To reduce this ratio, superplasticisers are used. However, the clays present in the aggregates trap both water and these superplasticisers, which leads to a loss of performance in the laying process, an over-consumption of admixtures, and difficulty controlling their dosage because of the variations caused by the clays in the aggregates.

Synthetic polymers have therefore been developed to inert the clays and avoid these problems. Document WO 98/58887 proposes the use of clay activity modifiers to limit the absorption of EO/PO type superplasticisers by these clays and thus increase the performance of cements and concretes. In particular, the document proposes the use of inorganic or organic cations, including cationic polymers such as quaternary polyamines which may be alkoxylated.

Document WO 2006/032785 proposes the use of cationic polymers with a charge density greater than 0.5 meq/g, in particular cationic polymers obtained by condensation of epichlorohydrin with a dialkylamine.

Document WO 2013/124003 proposes the use of other cationic polymers such as polyamines functionalised with cationic groups.

The clay inerting polymers described in the prior art are cationic, and research has been directed towards polymers with an increasingly high degree of cationicity in order to optimise performance. However, these cationic polymers have quaternary ammonium functions and contain high levels of chloride, which poses many problems.

Chlorides cause attacks on cementitious matrices affecting their mechanical strength. In addition to this physical/chemical aggression to which the matrix is subjected, there is also damage due to the corrosion of the metal rebars, which increases the risk of degradation of the structures.

Depassivation of the rebar steels starts when the chloride ions reach a critical concentration in the first rebar bed, after passing through the cover concrete. This critical concentration is currently very often standardised worldwide in concrete formulations at levels sometimes below 0.2% chlorides by mass of cement, values set by scientific knowledge, observation and experience.

The phenomena are very complex and lead to serious problems with the durability and safety of construction works. This is why the profession has set up standards such as NF EN 14629 relating to the measurement of the chloride content of hardened concrete. This standard is primarily intended to be used to estimate the risk of chloride-induced corrosion on steel rebar.

Professionals in the construction sector are therefore looking for solutions to reduce the chloride content of hydraulic compositions as much as possible.

WO 2018/054991 relates to a method for obtaining cationic high density polymers with a reduced chloride content. These cationic polymers can be used in mineral binder compositions to inhibit clays. However, they still contain too much chloride and cannot meet the requirements of the standards. The existing solutions are therefore not satisfactory.

The problem which the invention seeks to solve is to provide a clay inerting agent for hydraulic construction compositions with improved performance and no chloride content.

DETAILED DESCRIPTION

The invention is based on the observation that water-soluble polymers with a specific chemical nature and specific molecular weight offer improved clay inerting performance in hydraulic construction compositions and also meet the requirements of standards as they do not contain chloride.

It is also based on the observation that the inerting properties of clay are further improved when these water-soluble polymers comprise a specific amount of monomer units that are hydrophobic in nature.

With the present invention, it is possible to achieve the environmental objectives inherent in new technical innovations. In the present case, the polymers lead to a reduction in polymer consumption through improved performance.

Furthermore, as previously mentioned, the polymers of the invention do not contain chloride, which not only results in stronger construction materials, but above all, from an environmental point of view, drastically reduces the waste and pollution of water usually necessary for washing sands and aggregates on filter belts. This preserves this resource for better purposes and avoids contamination of the environment by polluted water.

Moreover, the absence of chloride helps to reduce the salification of water, which sometimes leads to desertification.

Finally, the monomers used in the polymers of the invention have a lower carbon footprint than the monomers used in the polymers of the prior art. Indeed, they are made up of only 3 carbons, which is the minimum to have a functional polymer (except for polyethylene) and are produced in a short circuit compared to oil.

Both in terms of their composition and their application benefits, these polymers are therefore more virtuous for the environment and its users.

The present invention relates to a method for inerting clays in hydraulic compositions intended for construction purposes, said method comprising a step of adding to the hydraulic composition or to one of its constituents at least one clay inerting agent, characterised in that the clay inerting agent is a water-soluble polymer comprising acrylamide, and/or vinylamine, and/or vinylformamide monomer units, and optionally monomer units of a different chemical nature from the abovementioned chemical natures, and characterised in that its weight average molecular weight is between Mw L and Mw H, such that:

$$Mw\ L=[AM]*30+[VA]*10+[VF]*10+[MO]*20, \text{ and}$$

$$Mw\ H=[AM]*500+[VA]*3000+[VF]*3000+[MO]*2000,$$

where [AM], [VA], [VF] and [MO] are respectively the monomer proportions in mol % with respect to the total number of monomer units of the polymer, of the monomer units of acrylamide, vinylamine, vinylformamide and of a different chemical nature from the aforementioned chemical natures, the sum of [AM], [VA], [VF] and [MO] being equal to 100 mol %.

In a preferred embodiment, the polymers of the invention are selected from:

- homopolymers of acrylamides,
- homopolyvinylamines,
- homopolyvinyformam ides,
- copolymers comprising two monomer units selected from: acrylamide, vinylformamide and vinylamine,
- terpolymers comprising acrylamide, vinylformamide and vinylamine monomer units,
- terpolymers comprising at least two monomer units selected from: acrylamide, vinylformamide and vinylamine, and at least monomer units having a hydrophobic nature.

According to the present invention, the clay inertant may be a composition comprising at least two water-soluble polymers according to the invention.

The water-soluble polymer according to the invention is preferably non-ionic, i.e. it contains no anionic or cationic charge.

In particular, the water-soluble polymer according to the invention does not contain chloride ions.

The invention also relates to a hydraulic composition for construction purposes comprising aggregates, at least one superplasticiser, and at least one clay inerting agent as described herein.

In the context of the invention, the term "water-soluble polymer" is taken to mean a polymer which gives an aqueous solution when dissolved under stirring at 25° C. and with a concentration of 20 $g \cdot L^{-1}$ in water.

"Polyacrylamide" means a polymer comprising acrylamide monomer units, "polyvinylamine" means a polymer comprising vinylamine monomer units, and "polyvinylformamide" means a polymer comprising vinylformamide monomer units.

The term "superplasticiser" refers to polymers that reduce the amount of water to maintain a high degree of slump in the hydraulic composition, e.g. high fluidity over a long period of time. Chemically these superplasticisers are carbon chain polymers such as polycarboxylates with oxyalkylated side chains such as ethoxy or propoxy.

The term "non-ionic polymer" means a polymer that has no cationic or anionic charge on its polymer chain.

The term "hydraulic composition" is used to define any hydraulically setting composition, especially mortars, concretes and cementitious compositions intended for the construction industry.

"One of its constituents", when this expression refers to the hydraulic composition, means the conventional constituents of a hydraulic composition, which are known to the person skilled in the art, such as aggregates (sand, limestone, etc.), superplasticisers, and hydraulic binders such as cementitious binders, for example mortar or concrete.

The term "aggregates" is used to define aggregates of varying particle size such as sand and gravel. They can be of any mineral nature, limestone, siliceous, silicocalcareous or otherwise. In particular, the aggregates described in the context of the present invention, such as sand for example, comprise clays.

The term "clays" refers to aluminium and/or magnesium silicates, in particular phyllosilicates with a layered structure, the layers being typically spaced about 7 to about 14 Angstroms apart. However, the term also covers other types of clays, such as amorphous clays. Clays commonly found in aggregates include montmorillonite, illite, kaolinite and muscovite.

The proportion of monomer units of acrylamide, and/or vinylamine, and/or vinylformamide in the water-soluble polymer according to the invention is preferably at least 70 mol % with respect to the total monomer units of the polymer, more preferably at least 80 mol %, more preferably at least 90 mol %, still more preferably at least 95 mol %. In addition to the acrylamide, vinylformamide and vinylamine monomer units, the polymer according to the invention may comprise monomer units of a different chemical nature from the aforementioned chemical natures. "The aforementioned chemical natures" means acrylamide, vinylformamide and vinylamine. These monomer units of different chemical nature can be monomer units of a hydrophobic nature, cationic monomer units, anionic monomer units, zwitterionic monomer units, preferably monomer units of hydrophobic nature.

The polymer according to the invention advantageously comprises only acrylamide and/or vinylamine and/or vinylformamide monomer units, and optionally monomer units of hydrophobic nature.

The water-soluble polymer is preferably selected from acrylamide homopolymers, homopolyvinylamines, homopolyvinylformamides, more preferably homopolyvinylamines, homopolyvinylformamides.

The acrylamide/vinylamine copolymers advantageously comprise only acrylamide and vinylamine monomer units. The acrylamide/vinylformamide copolymers advantageously comprise only acrylamide and vinylformamide monomer units. The vinylamine/vinylformamide copolymers advantageously comprise only vinylamine/vinylformamide monomer units. The acrylamide/vinylamine/vinylformamide terpolymers advantageously comprise only acrylamide, vinylamine and vinylformamide monomer units. The polymers according to the invention also advantageously comprise monomer units of hydrophobic nature.

The proportions of the monomer units of acrylamide, vinylamine and/or vinylormamide may be adjusted by the person skilled in the art.

The polymers according to the invention can advantageously comprise between 0.001 and 20 mol % of monomer units of hydrophobic nature, preferably between 0.1 and 15 mol %, and more preferably between 0.1 and 10 mol %. The monomers having a hydrophobic nature are preferably selected from the group consisting of esters of (meth)acrylic acid having an alkyl, hydroxyalkyl, arylalkyl, propoxylated, ethoxylated or ethoxylated and propoxylated chain; (meth) acrylamide derivatives having an alkyl, hydroxyalkyl, arylalkyl, propoxylated, ethoxylated, ethoxylated and propoxylated, or dialkyl chain; alkyl aryl sulfonates. They are preferably selected from hydroxyethylacrylate, ethylhexyl acrylate, hydroxypropylacrylate, butylacrylate, propylacrylate, dimethylacrylamide, butylacrylamide, terbutylacrylamide.

The presence of monomers of hydrophobic nature in the polymer according to the invention makes it possible to improve performance over a wider range of dosages, thus allowing greater flexibility in the use of the clay inertants according to the invention at processing sites, whether in quarries for aggregates, or at production sites for hydraulic compositions. The person skilled in the art knows how to adjust the dosage to obtain the optimum performance.

Mannich products obtained by reacting formaldehyde and dimethylamine with a polymer comprising acrylamide monomer units are also polymers according to the invention. Typically these polymers do not contain chloride ions. These products can be protonated by the addition of a non-chlorinated alkylating agent, preferably diethylsulphate. The molecular weight of the Mannich products according to the invention is between Mw L and Mw H.

Throughout the invention, it will be understood that the molar percentage of the polymer monomers will be 100%.

As already mentioned, the polymers according to the invention preferably do not contain any cationic or anionic charge at the pH at which the product is used, which is generally between 10 and 13. Preferably, they do not contain a cationic, anionic or zwitterionic monomer unit.

The weight average molecular weight of the polymer according to the invention is expressed in daltons, and is between Mw L and Mw H, such that $$Mw\ L=[AM]*30+[VA]*10+[VF]*10+[MO]*20, \text{ and}$$

$$Mw\ H=[AM]*500+[VA]*3000+[VF]*3000+[MO]*2000,$$

where [AM], [VA], [VF] and [MO] are respectively the monomer proportions in mol % with respect to the total number of monomer units of the polymer, of the monomer units of acrylamide, vinylamine, vinylformamide and of a different chemical nature from the aforementioned chemical natures.

Thus, the weight average molecular weight of the polymer according to the invention is in the range [Mw L-Mw H], where Mw L is the lower limit of this range and Mw H is the upper limit of this range.

When the polymer comprises several types of monomer units of a different chemical nature than acrylamide, vinylamine, vinylformamide monomer units, then the monomer proportion [MO] is equal to the sum of the proportions of these monomer units of a different chemical nature.

When the polymer comprises, for example, 90 mol % acrylamide monomer units, 5 mol % butylacrylate monomer units, and 5 mol % dimethylacrylamide monomer units, then [MO] is 10 mol %, Mw L is 2900 daltons, and Mw H is 65000 daltons.

When the water-soluble polymer according to the invention comprises at least 80 mol % acrylamide monomer units, then its weight average molecular weight is preferably between 2.5*Mw L and 0.8*Mw H, more preferably between 3.3*Mw L and 0.6*Mw H, these preferred ranges thus constituting more restricted weight average molecular weight ranges than the aforementioned [Mw L-Mw H] range. When the polymer according to the invention is an acrylamide homopolymer, its weight average molecular weight is preferably between 7500 and 40,000 daltons, more preferably between 10,000 and 30,000 daltons.

When the water-soluble polymer according to the invention comprises at least 80 mol % vinylamide and/or vinylformamide monomer units, then its weight average molecular weight is preferably between 2*Mw L and 5/6 (five-sixths) *Mw H, more preferably between 5*Mw L and 2/3 (two-thirds) 0.8*Mw H, these preferred ranges thus constituting more restricted weight average molecular weight ranges than the aforementioned [Mw L-Mw H] range. When the polymer according to the invention is a homopolyvinylamide or homopolyvinylformamide, its weight average molecular weight is preferably between 7500 and 40,000 daltons, more preferably between 10,000 and 30,000 daltons.

According to the invention, the polymer can have a linear, branched, star, comb, dendritic, or block structure. The polymer is advantageously linear or structured, preferably linear. A structured polymer is a non-linear polymer with side chains.

In general, the polymer does not require the development of a particular polymerisation method. Indeed, it can be obtained by all polymerisation techniques well known to the person skilled in the art. These include solution polymerisation; gel polymerisation; precipitation polymerisation; emulsion polymerisation (aqueous or reverse); suspension polymerisation; reactive extrusion polymerisation; water-in-water polymerisation; or micellar polymerisation.

The polymerisation is generally a free radical polymerisation, preferably by solution polymerisation. Free radical polymerisation includes free radical polymerisation using UV, azo, redox or thermal initiators as well as controlled radical polymerisation (CRP) or matrix polymerisation techniques.

A particularly advantageous technique for the manufacture of the polymers of the invention is RAFT (Reversible Addition-Fragmentation Chain Transfer) polymerisation, which makes it possible to synthesise polymers of controlled architecture (block polymers, stars, combs, etc.) with low polydispersity and high functionality.

Polyvinylamines can be obtained by :

Hofmann degradation reaction on a (co)polymer comprising at least one non-ionic monomer selected from the group comprising, but not limited to, acrylamide, methacrylamide, N,N dimethylacrylamide, t-butylacrylamide, octylacrylamide, and/or, A (co)polymerisation reaction of at least one monomer of formula (I):

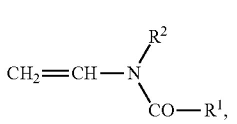

(I)

where R1 and R2 are, independently, a hydrogen atom or an alkyl chain of 1 to 6 carbons, followed by partial or complete removal of the —CO—R1 group, for example by hydrolysis, to form amine functions.

Examples of monomers of formula (I) include N-vinylformamide, N-vinyl-N-methylformamide, N-vinylacetamide, N-vinyl-N-methylacetamide, N-vinyl-N-ethylacetamide, N-vinyl-propianamide, and N-vinyl-N-methylpropianamide and N-vinylbutyramide. The preferred monomer is N-vinylformamide.

These monomers of formula (I) can be used alone or copolymerised with other monomers in the broad sense, such as acrylamide or monomers of hydrophobic nature, provided that they are not susceptible to hydrolysis.

Polyvinylamines are preferably obtained by hydrolysis reaction, preferably basic, of polyvinylformamide. Polyvinylformamides are obtained according to methods known to the person skilled in the art.

Gel permeation chromatography (GPC) is used to determine the weight average molecular weight. The weight average molecular weight is measured for example on an Agilent 1260 Infinity system equipped with a Dawn HELOS multi-angle light scattering detector, OPtilab T-Rex and two columns in series: Shodex SB 807-HQ and Shodex 805-HQ. The samples are diluted to 1000 ppm in the saline mobile phase and filtered at 1.2 μm. As direct measurement of polyvinylamines is complicated, their molecular weight was established on the preferred polyacrylamide or poly(N-vinylformamide) precursor using the same equipment system and considering that the transformation to polyvinylamine is quantitative, i.e. the reaction involved is complete.

The polymer clay inerting agent can be used in different forms, preferably as an aqueous solution, preferably comprising between 1 and 50% by weight of the inerting agent. It can be added by pouring or spraying into the hydraulic composition or into one of its components.

The hydraulic composition preferably contains a cementitious binder. It is preferably a mortar or concrete. It will preferably contain between 20 and 90 wt % of aggregates, between 0.01 and 1 wt % of superplasticiser based on the dry base of the composition. The other ingredients of the hydraulic composition are those commonly found in the manufacture of such compositions. The method of preparation of the hydraulic composition will be made according to the knowledge of the person skilled in the art.

In the case where the inerting agent according to the invention is added to the hydraulic composition, it is added during the preparation of the composition at any stage of its preparation. It is easy to use and there are no mixing difficulties.

In the case where the inerting agent according to the invention is added to one of its constituents, this addition is made prior to the addition of this constituent to the hydraulic composition. This may include, for example, the addition of the inerting agent to aggregates for the preparation of hydraulic compositions.

In this case the aggregates are brought into contact with the inerting agent, preferably by mixing the whole during or after the treatment in order to ensure a good distribution of the composition and to obtain a homogeneously treated material. Aggregates with a clay content of 0.1 to 2% by weight are generally processed. The aggregate should preferably be dry (moisture content less than 10% by weight) at the time of processing. The aggregate will preferably be processed in a quarry.

In principle, it is sufficient to bring the inerting agent into contact with the aggregate to ensure the inerting of the clays contained in them. A few seconds or a few minutes of contact is generally sufficient.

The inerting agent is preferably used in an appropriate amount to ensure complete inerting of the clays present in the aggregates or in the hydraulic composition.

As an example, the treatment of an aggregate is generally satisfactory with a dosage of 2 to 200 ppm of inerting agent in relation to the weight of the aggregate. The person skilled in the art knows how to adjust the dosage to obtain the optimum performance.

The addition of the inerting agent allows, as previously explained, an improvement in the inhibition of clays while offering a chloride-free solution thus meeting the requirements of standards and the expectations of the market. In the long term, it helps to reduce the corrosion of metals, reduce the attack on the cement matrix and thus increase the durability of structures.

The following examples are only illustrative of the subject matter of the invention, without limiting it in any way.

EXAMPLES

1. Clay-Inerting Polymer

The polymers according to the invention detailed in the examples do not contain chlorides. The methods for obtaining the polymers are described below.

Acrylamide homopolymers are obtained by a polymerisation method in a deionised water solution. The amount of transfer agent is adjusted to achieve the molar masses described in Table 1.

Homopolyvinylamines are obtained by alkaline hydrolysis of a poly(N-vinylformamide) by a polymerisation method in a water solution. Hydrolysis is quantitative.

The acrylamide/vinylamine copolymer is obtained by Hofmann degradation of a polyacrylamide in the presence of sodium hypobromite and then pouring the polyisocyanate into excess acid.

The copolymer of acrylamide and N-vinylformamide is obtained by copolymerising acrylamide and N-vinylformamide by a polymerisation method in a deionised water solution.

The terpolymer of acrylamide, vinylamine and N-vinylformamide is obtained by Hofmann degradation of the copolymer of acrylamide and N-vinylformamide as described above.

Table 1 below summarises the compositions of the synthesised polymers.

TABLE 1

Compositions of clay-inerting polymers

| | Polymer composition (% by weight) | | | | | | Mw |
|---|---|---|---|---|---|---|---|
| | ACM | VA | EPI-DMA | DMA | VF | BA | (daltons) |
| Ex 1 | 100 | | | | | | 4000 |
| Ex 2 | 100 | | | | | | 8000 |
| Ex 3 | 100 | | | | | | 15000 |
| Ex 4 | 100 | | | | | | 18000 |
| Ex 5 | 100 | | | | | | 32000 |
| Ex 6 | | 100 | | | | | 2000 |
| Ex 7 | | 100 | | | | | 30000 |
| Ex 8 | | 100 | | | | | 120000 |
| Ex 9 | 50 | 50 | | | | | 24000 |
| Ex 10 | 95 | | | 5 | | | 13000 |
| Ex 11 | | | | | 100 | | 278000 |
| Ex 12 | 95 | | | | | 5 | 28000 |
| Ex 13 | 50 | | | | 50 | | 28000 |
| Ex 14 | 25 | 25 | | | 50 | | 25000 |
| Ex 15 | | 50 | | | 50 | | 4000 |
| Cex 1 | 100 | | | | | | 2000 |
| Cex 2 | 100 | | | | | | 58000 |
| Cex 3 | | | 100 | | | | 2000 |

ACM: Acrylamide
VA: Vinylamine
EPI/DMA: cationic polymer obtained by polycondensation of epichloridrin and dimethylacrylamide
DMA: dimethylacrylamide
VF: Vinylformamide
BA: Butyl Acrylate
Mw: Weight average molecular weight
The polymer in counter-example 3 contains 26% by weight of chlorides.

2. Application Testing

Classic Portland Cement (Lafarge, CEM II—32.5 R, Cimenterie Le Teil), standard sand (Société Nouvelle du Littoral) and clay (bara-kade 200, Bentonite Performance Minerals LLC) are added to the mixer bowl and mixed at low speed for 15 s to homogenise the mixture. An aqueous solution of superplasticiser (Floset SH5) and clay inertant is prepared and added over a period of 30 s to the cement mixture under low speed agitation. The paste is then mixed for another 5 minutes. The water/cement ratio is set at 0.45, the superplasticiser is dosed at 0.5% by mass in relation to the weight of cement, the sand/cement ratio is equal to 3. The amount of inertant is dependent on the product tested and is expressed as a % of dry product to sand.

The paste is then poured into an inverted cone (Abrams cone) on a Plexiglas plate. This cone is lifted and the paste spreads. The diameter of the cake (D) is measured.

This is compared with the diameter of the cake without clay (Dmax=320 mm) and the diameter of the cake without inertant (Dmin=250 mm) by applying the following formula:

$$\% \text{ spread found} = (D - D\min)/(D\max - D\min) \times 100$$

The closer the value is to 100%, the better the clay inhibition.

The previously synthesised clay-interting polymers are thus tested. For each example the optimum point in terms of performance was determined. These results are reported in the following Table 2.

TABLE 2

| Application test results | | |
|---|---|---|
| | Dosage (ppm/sand) | Spread recovered (%) |
| Ex 1 | 45 | 57 |
| Ex 2 | 40 | 53 |
| Ex 3 | 32 | 57 |
| Ex 4 | 32 | 57 |
| Ex 5 | 45 | 52 |
| Ex 6 | 5 | 93 |
| Ex 7 | 13 | 67 |
| Ex 8 | 7 | 67 |
| Ex 9 | 23 | 53 |
| Ex 10 | 50 | 63 |
| Ex 11 | 29 | 100 |
| Ex 12 | 32 | 80 |
| Ex 13 | 37 | 85 |
| Ex 14 | 15 | 93 |
| Ex 15 | 32 | 53 |
| Cex 1 | 63 | 36 |
| Cex 2 | 81 | 43 |
| Cex 3 | 90 | 46 |

The clay-inerting polymers of the invention provide superior performance to the counterexamples. Indeed, they offer at least 50% recovery of the spread obtained without inertant, whereas this value is less than 50% for the other polymers. In addition, the polymers of the invention make it possible to significantly reduce dosages while being more effective. Polyvinylamine shows excellent results with more than 60% of the spread recovered at dosages below 20 ppm. Polyvinylformamide also shows excellent performance with 100% spread recovered. Finally, it is noted that the cationic polymer of counter-example 3, which contains chlorides (26% by weight), offers a lower performance than the polymers according to the invention which do not contain them.

3. Series of Tests on Copolymers Containing a Monomer with a Hydrophobic Nature

The polymer of example 4 is compared to the polymers of examples 10 and 12. The same application test as in part 2 is performed. The polymer dosages vary and the performance is shown in Table 3.

TABLE 3

| Application test results | | | |
|---|---|---|---|
| | Dosage (ppm/sand) | Spread recovered (%) | Percentage loss of spread/optimum |
| Ex 4 | 25 | 35 | 39 |
| Ex 4 | 28 | 45 | 21 |
| Ex 4 | 32 | 57 | 0% |
| Ex 4 | 36 | 40 | 30 |
| Ex 4 | 39 | 32 | 44 |
| Ex 10 | 40 | 52 | 17 |
| Ex 10 | 45 | 60 | 5 |
| Ex 10 | 50 | 63 | 0% |
| Ex 10 | 55 | 61 | 3 |
| Ex 10 | 60 | 60 | 5 |
| Ex 12 | 25 | 74 | 8 |
| Ex 12 | 28 | 77 | 4 |
| Ex 12 | 32 | 80 | 0% |
| Ex 12 | 36 | 74 | 8 |
| Ex 12 | 39 | 67 | 16 |

The clay-inerting polymers of the invention containing a hydrophobic monomer (Ex10 and 12) offer good performance over a wider range of dosages, thus allowing greater flexibility in their use on processing sites, whether in quarries for aggregates or at the production sites of hydraulic compositions.

The invention claimed is:

1. A method for inerting clays in hydraulic compositions intended for construction purposes, comprising adding to the hydraulic composition or to one of its constituents at least one clay inerting agent, wherein the clay inerting agent is a non-ionic water-soluble polymer comprising monomer units selected from the group consisting of acrylamide, vinylamine and vinylformamide monomer units, monomer units other than acrylamide, vinylamine and vinylformamide, and mixtures thereof, and wherein its average weight molecular weight is between Mw L and Mw H, such that:

$$Mw\ L = [AM]*30 + [VA]*10 + [VF]*10 + [MO]*20, \text{ and}$$

$$Mw\ H = [AM]*500 + [VA]*3000 + [VF]*3000 + [MO]*2000.$$

where [AM], [VA], [VF] and [MO] are respectively the monomer proportions in mol % with respect to the total number of monomer units of the polymer, of the monomer units of acrylamide, vinylamine, vinylformamide, and the other monomer units, the sum of [AM], [VA], [VF] and [MO] being equal to 100 mol %.

2. The method according to claim 1 wherein the water-soluble polymer is selected from among:

homopolymers of acrylamides, homopolyvinylamines, homopolyvinyformamides, copolymers comprising two monomer units selected from the group consisting of acrylamide, vinylformamide and vinylamine, terpolymers comprising acrylamide, vinylformamide and vinylamine monomer units, and terpolymers comprising at least two monomer units selected from the group consisting of acrylamide, vinylformamide and vinylamine, and at least monomer units having a hydrophobic nature.

3. The method according to claim 1, wherein the water-soluble polymer contains only monomer units selected from the group consisting of acrylamide and vinylamine and vinylformamide monomer units, and monomer units of a hydrophobic nature.

4. The method according to claim 1, wherein the water-soluble polymer is selected from the group consisting of acrylamide homopolymers, homopolyvinylamines and homopolyvinylformamides.

5. The method according to claim 1, wherein the proportion of acrylamide, vinylamine, and vinylformamide monomer units in the water-soluble polymer is at least 70 mol % relative to the total monomer units of the polymer.

6. The method according to claim 1, wherein the water-soluble polymer comprises monomer units of a hydrophobic nature.

7. The method according to claim 1, wherein the water-soluble polymer comprises between 0.001 and 20 mol % monomer units of a hydrophobic nature.

8. The method according to claim 5, wherein the monomers of a hydrophobic nature are selected from the group consisting of hydroxyethylacrylate, hydroxypropylacrylate, butylacrylate, propylacrylate, dimethylacrylamide and butylacrylamide.

9. The method according to claim 1, wherein the water-soluble polymer comprises at least 80 mol % acrylamide monomer units, and has an average molecular weight between 2.5*Mw L and 0.8*Mw H.

10. The method according to claim 1, wherein the water-soluble polymer comprises at least 80 mol % vinylamide and/or vinylformamide monomer units, and has an average molecular weight between 2*Mw L and 5/6*Mw H.

11. The method according to claim 1, wherein the non-ionic water-soluble polymer is linear.

12. The method according to claim 1, wherein the water-soluble polymer is added to the hydraulic composition or to one of its constituents, the hydraulic composition comprising aggregates, at a dosage of 2 to 200 ppm of inerting agent based on the weight of aggregates.

13. A method for inerting clays in hydraulic compositions intended for construction purposes, said method comprising a step of adding to the hydraulic composition or to one of its constituents at least one clay inerting agent, wherein the clay inerting agent is a water-soluble polymer selected from the group consisting of acrylamide, vinylamine and vinylformamide monomer units, and mixtures thereof, and wherein its weight average molecular weight is between Mw L and Mw H, such that:

$$Mw\ L = [AM]*30 + [VA]*10 + [VF]*10, \text{ and}$$

$$Mw\ H = [AM]*500 + [VA]*3000 + [VF]*3000,$$

where [AM], [VA] and [VF] are respectively the monomer proportions in mol % with respect to the total number of monomer units of the polymer, of the monomer units of acrylamide, vinylamine and vinylformamide, the sum of [AM], [VA] and [VF] being equal to 100 mol %.

14. The method according to claim 1, wherein the water-soluble polymer contains only monomer units selected from the group consisting of acrylamide vinylamine and/or and vinylformamide monomer units, and mixtures thereof.

* * * * *